Patented Feb. 28, 1928.

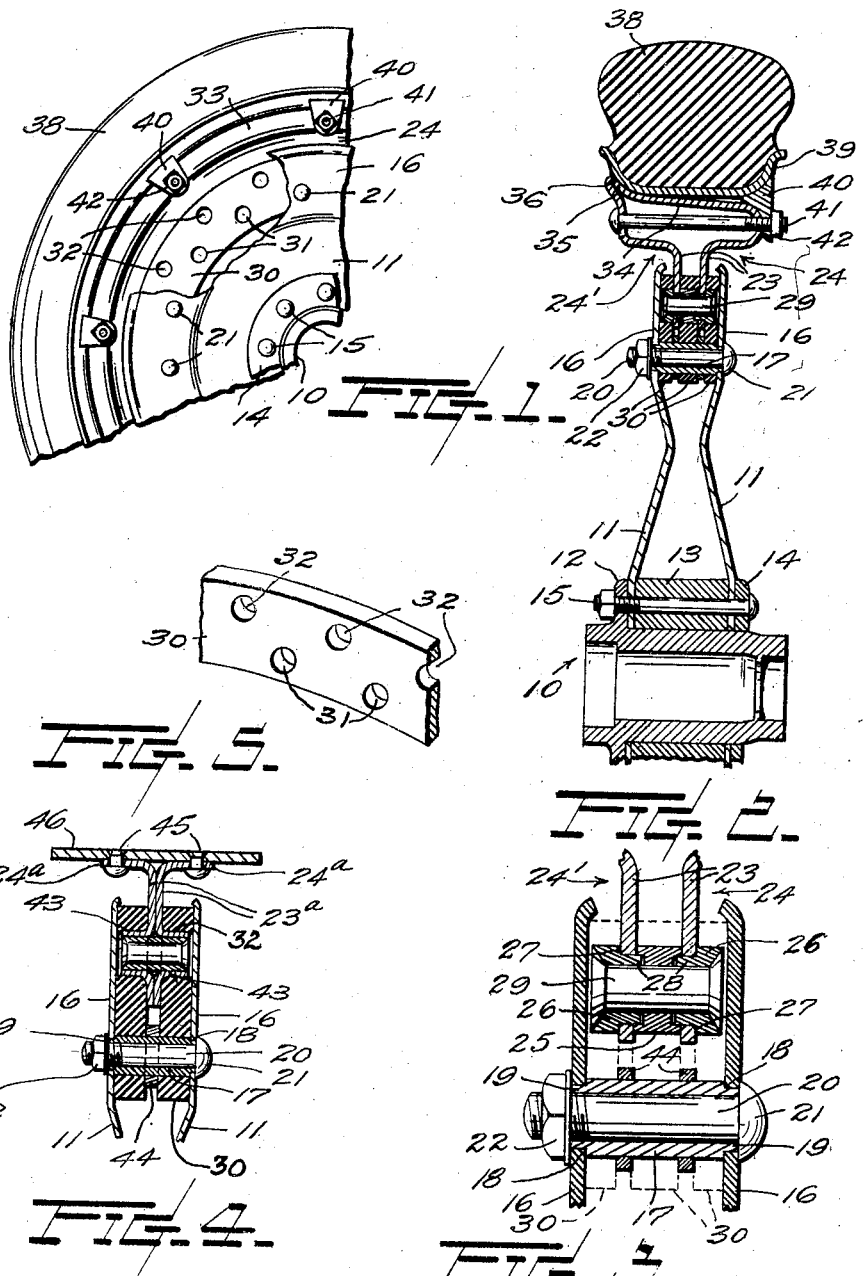

1,660,522

UNITED STATES PATENT OFFICE.

HARRY M. PATCH, OF SEATTLE, WASHINGTON.

RESILIENT WHEEL.

Application filed November 18, 1926. Serial No. 149,019.

This invention relates to a resilient vehicle wheel; and its object is the provision of a wheel of this character having two relatively movable rigid members which are operatively connected with each other through the medium of annular elastic cushioning members which will absorb shocks and otherwise improve the riding qualities of the vehicle.

A further object of the invention is to provide elastic wheel members of peculiar form and devise a novel manner of connecting the same to the rigid members of the wheel whereby the road stresses are uniformly distributed for the purpose of rendering the wheel stronger, more durable and more efficient than other resilient wheels.

More specific objects and advantages of the invention will appear in the following description.

The invention is illustrated in the accompanying drawing, in which,—

Figure 1 is a fragmentary side elevation of a wheel with parts broken away showing one embodiment of the invention; Fig. 2 is a fragmentary transverse section of the same; and Fig. 3 is a fragmentary detail transverse sectional view of parts shown in Fig. 2 to a larger scale. Fig. 4 is a transverse sectional view of a part of a wheel embodying a slightly modified form of the invention. Fig. 5 is a perspective view of a portion of one of the resilient members shown in the preceding views.

In said drawing, the reference numeral 10 represents a wheel hub and 11 companion plates of annular shape which are rigidly secured to the hub flange 12 in spaced apart relation as by means of collars 13 and 14 and a plurality of bolts 15. The outer peripheral portions 16 of the plates 11 are plane and are held parallel with each other by means of spacing sleeves 17 provided with shoulders 18 (Fig. 3) adapted to bear against the respective plates and having reduced ends 19 fitting in holes, provided in the plate portions 16, cooperating with screw bolts 20 extending through the sleeves and having heads 21 and nuts 22, respectively, engaging against the outer surfaces of the plates.

The above described parts provide a rigid structure, including the hub, and constitute what will be hereinafter termed as the hub member.

Extending into the space between the plate portions 16 of such hub member are plane portions 23 of companion plates 24 and $24^1$ of what will be hereinafter termed the rim member.

In the embodiment illustrated in Figs. 2 and 3, the plate portions 23 are held in parallel spaced apart relation with each other.

To which end I provide sleeves each composed of a central element 25 interposed between the plates, and outside end elements 26. Said outside elements 26 of a sleeve have at their outer ends circumferential shoulders 27 to bear against the respective plates and reduced extremities 28 which fit within holes provided therefor in the plates 24 and $24^1$ and thence extend into counter bores provided in the respective intermediate sleeve element 25 for holding the associated elements of a sleeve assembly in axial alignment with each other. The sleeve elements of each assembly are united with the plates 24 and $24^1$ by means of a riveted bolt 29.

The sleeves 17 of the hub member are disposed concentrically and in circumferentially spaced apart relation with respect to the wheel axis. The rim-member sleeves, composed of assemblies of elements 25 and 26, are also arranged in circumferentially spaced apart positions in a circle whose diameter is greater than the diameter of the circle of the sleeves 17.

Cooperating with said inner and outer members are two or more annular rubber members, or rings 30, three being shown by full lines in Fig. 2 and by dotted lines in Fig. 3.

The inner diameter of an elastic member or ring, as hereinafter termed, is less than that of the circle of the axes of the sleeves 17 and also less than the diameter of the central opening of the plates of the rim member. Thus the elastic rings 30 when applied constitute a flexible extension of the rim member into the region of the hub member wherein are located the sleeves 17. The rings 30 are connected to the rigid members of the wheel by means of the sleeves of the respective members. For which purpose said rings are provided with two sets of circumferentially disposed holes 31 and 32, as shown in Figs. 1 and 5. The holes 31 are of diameters and arranged to have the sleeves of the hub member fit within and extend entirely through the respective holes of the rings.

The holes 32 of the rings are of diameters and are arranged to have the outer portions of the sleeves of the rim member fit within the respective rings. By preference, the holes 31 are disposed in zig-zag relation with respect to the holes 32 to afford circumferentially of the rings imperforate arcuate portions intermediate proximating holes circumferentially of the rings.

In the wheel construction illustrated in Figs. 1 and 2, three rings 30 are employed, one of which is located between the plate portions 23 of the rim member and the other two rings complementary thereto are disposed between the plates 11 of the hub member and the outer surfaces of the plate portions 23 of the rim member. In practice, washers 44 of thickness corresponding to those of the plate portions 23 are mounted upon the sleeves 17 for the purpose of holding the rings apart in proximity to their inner peripheries.

The combined thicknesses of the assembled elastic rings 30 and the plate portions 23 of one member, equal the distance between the plate portions 16 of the other member; but the extreme lengths of the respective sleeve elements 25 and 26 and the associated bolts 29 are less than the spacing apart of the plate portions 16 of the hub member, permitting relative axial movement of the two wheel members and also relative movement of the members at right angles to the wheel axis or in the plane of the wheel, which movements being afforded by the resiliency of rings and with an absence of wheel noise.

As soon as Figs. 1 and 2, the side plate 24 of the rim member is bent back as at 33 upon itself and thence extends as at 34 to an edge 35 which seats within a peripheral groove 36 of the side plate 24$^1$. The tire 38, herein shown as of the solid type, is seated in a channeled rim 39 which is adapted to be detachably secured upon the wheel structure as by means of wedge blocks 40 and securing bolts 41 provided with nuts 42.

In Fig. 4 I illustrate a modified embodiment of the invention adapting the same to a construction wherein but two rubber rings 30 are employed.

In such embodiment, plate portions 23$^a$ of the rim wheel-member are juxtaposed with each other to eliminate any ring receiving space therebetween. These plate portions 23$^a$ are furthermore formed to provide tubular bosses 43 which, like the sleeve parts 26 of the hereinbefore described embodiment of the invention, serve as studs which are engageable in the holes 32 of the rubber rings.

The sleeves 17 and the means for securing the same to the side plates of the hub member are in the modified form (Fig. 4) similar in construction and operation to the correspondingly described elements with respect to Figs. 2 and 3.

Where two rings 30 are used, a single washer 44 on sleeve 17 will answer between the rings. In Fig. 4 the plates of the rim member of the wheel are flanged as at 24$^a$ and have secured thereto by rivets 45 a rim plate 46.

The rubber rings serve to yieldably couple the hub and rim wheel members together within the space provided between the plates of the hub member and in overlapping relation with the inner peripheral portion of the rim member.

The rubber rings, moreover, are connected to the hub and rim members by means of devices rigid with the respective members and arranged in alternating relations circumferentially of the wheel in a manner permitting movements of the members with respect to each other in three directions: circumferentially and diametrically of the wheel in the plane of the wheel, and axially of the wheel.

The construction and operation of my invention will be understood from the foregoing description.

What I claim, is,—

1. A resilient wheel comprising a hub member including two companion side plates and plate spacing means, a rim member extending into the space between the plates of the hub member, rubber rings interposed between the two members at opposite sides of the rim member, ring engaging means provided on the rim member, said rings being provided with holes in which are engaged the plate spacing means of one of said members and the ring-engaging means of the other member for connecting the rings with the respective members.

2. A resilient wheel comprising a hub member having circular companion side plate elements and a hub element, means provided in proximity of the peripheries of said side plates for retaining the latter in spaced apart relation, a rim member extending into the space between the side plates of the hub member, studs protruding from the opposite sides of said rim member, elastic rings positioned in said space at opposite sides of the rim member, said rings being provided with series of holes to receive the plate spacing means of the hub member and the studs of the rim member whereby said members are coupled with each other through the medium of the elastic rings.

Signed at Seattle, Washington, this 3rd day of November, 1926.

HARRY M. PATCH.